United States Patent
Kim et al.

(10) Patent No.: US 8,700,982 B2
(45) Date of Patent: Apr. 15, 2014

(54) SYSTEM, DEVICE AND METHOD FOR PROVIDING INTERACTIVE CONTENT ON AN COMPUTING DEVICE

(75) Inventors: Sang-Heun Kim, Mississauga (CA); Charles Laurence Stinson, Mississauga (CA); Grzogorz Padiasek, Mississauga (CA)

(73) Assignee: BlackBerry Limited, Waterloo (CA)

( * ) Notice: Subject to any disclaimer, the term of this patent is extended or adjusted under 35 U.S.C. 154(b) by 380 days.

(21) Appl. No.: 12/413,925

(22) Filed: Mar. 30, 2009

(65) Prior Publication Data

US 2010/0251125 A1    Sep. 30, 2010

(51) Int. Cl.
G06F 17/00    (2006.01)

(52) U.S. Cl.
USPC ............................ 715/224; 715/223; 715/226

(58) Field of Classification Search
USPC ......... 715/224–226, 234, 235, 735, 221, 222, 715/223
See application file for complete search history.

(56) References Cited

U.S. PATENT DOCUMENTS

| | | |
|---|---|---|
| 5,583,983 A | 12/1996 | Schmitter |
| 5,995,102 A | 11/1999 | Rosen et al. |
| 6,295,061 B1 | 9/2001 | Park et al. |
| 6,828,988 B2 | 12/2004 | Hudson et al. |
| 6,882,825 B2 | 4/2005 | Hopkins et al. |
| 6,904,569 B1 | 6/2005 | Anderson |
| 7,032,036 B2 | 4/2006 | Linsley |
| 7,320,107 B2 | 1/2008 | Chwa |
| 7,376,913 B1 | 5/2008 | Fleck et al. |
| 2002/0054161 A1 | 5/2002 | Durham |
| 2002/0065842 A1* | 5/2002 | Takagi et al. ................. 707/500 |
| 2002/0133540 A1 | 9/2002 | Sears et al. |
| 2003/0020747 A1 | 1/2003 | Korala |
| 2003/0088716 A1 | 5/2003 | Sanders |
| 2004/0027373 A1* | 2/2004 | Jacquot et al. ................ 345/730 |
| 2004/0073626 A1 | 4/2004 | Major et al. |
| 2004/0199603 A1 | 10/2004 | Tafla et al. |

(Continued)

FOREIGN PATENT DOCUMENTS

| | | |
|---|---|---|
| EP | 1736878 A1 | 12/2006 |
| GB | 2354854 A | 4/2001 |

(Continued)

OTHER PUBLICATIONS

Rick, Nintendo DS Fact Sheet, Aug. 2004, GameCubicle.com. Retrieved from URL http://www.gamecubicle.com/hardware-nintendo_ds_spec_sheet.htm.*

(Continued)

*Primary Examiner* — Adam M Queler
*Assistant Examiner* — Howard Cortes
(74) *Attorney, Agent, or Firm* — Perry + Currier Inc.; Kristjan Spence

(57) ABSTRACT

A system, device and method for providing interactive content on a computing device is provided. In an embodiment, a computing device in the form of a portable computing device is configured to execute a primary web browser application and a secondary web browser application. The primary web browser application is configured to generate a web-page including a fillable form on the portable computing device. The secondary web browser application is configured to receive the input for the fillable form by generating a mirrored fillable form, and to automatically populate the fillable form on the web-page using the completed version of the mirrored fillable form.

19 Claims, 10 Drawing Sheets

(56) References Cited

U.S. PATENT DOCUMENTS

| | | | |
|---|---|---|---|
| 2005/0132286 A1 | 6/2005 | Rohrabaugh et al. | |
| 2006/0064411 A1 | 3/2006 | Gross et al. | |
| 2006/0143568 A1 | 6/2006 | Milener et al. | |
| 2007/0028303 A1 | 2/2007 | Brennan | |
| 2007/0113237 A1* | 5/2007 | Hickson | 719/318 |
| 2007/0180148 A1 | 8/2007 | Yadidian | |
| 2007/0206221 A1 | 9/2007 | Wyler et al. | |
| 2007/0208834 A1 | 9/2007 | Nanamura et al. | |
| 2008/0071857 A1 | 3/2008 | Lie | |
| 2008/0077880 A1 | 3/2008 | Oygard | |
| 2008/0178098 A1* | 7/2008 | Yoon et al. | 715/762 |
| 2008/0256485 A1 | 10/2008 | Krikorian | |
| 2008/0288515 A1 | 11/2008 | Kim et al. | |
| 2009/0013085 A1 | 1/2009 | Liberman Ben-Ami et al. | |
| 2009/0064020 A1* | 3/2009 | Morris | 715/765 |
| 2010/0192185 A1 | 7/2010 | Margulis | |
| 2011/0014934 A1 | 1/2011 | Rybak et al. | |
| 2011/0077032 A1* | 3/2011 | Correale et al. | 455/466 |
| 2012/0054593 A1* | 3/2012 | Naderi | 715/224 |

FOREIGN PATENT DOCUMENTS

| | | |
|---|---|---|
| KR | 1020070119151 A | 12/2007 |
| WO | 01/86462 A1 | 11/2001 |
| WO | 2004/109557 A1 | 12/2004 |
| WO | 2008/098174 A1 | 8/2008 |
| WO | 2008141424 A1 | 11/2008 |

OTHER PUBLICATIONS

Opera Software ASA, Nintendo DS Browser Instruction Booklet, 2006, Nintendo of America Inc. Retrieved from URL http://www.nintendo.com/consumer/downloads/DSBrowser.pdf.*
International Business Machines Corporation, Notebook views within web pages (Research Disclosure Database No. 433111), May 2000, Kenneth Mason Publications Ltd.*
Heitmeyer, David P., CSCI E-153, Web Development Using XML—XForms, XQuery, Dec. 12, 2006. Retrieved from http://cscie153.dce.harvard.edu/lecture_notes/2006/20061212/handout.html.*
Microsoft Corporation, Microsoft Computer Dictionary, 2002, Microsoft Corporation, Fifth Edition, pp. 147-148, 328, 596, 710, 726.*
No Author, EPA Environmental Information Exchange Network & Grant Program Glossary, May 28, 2008, EPA. Originally available at http://www.epa.gov/exchangenetwork/glossary.html; this version retrieved from http://replay.waybackmachine.org/20080328062837/http://www.epa.gov/exchangenetwork/glossary.html.*
No Author, JavaScript Credit Card Validation Function, Nov. 28, 2007, Braemoor Software Freebies. Originally available at http://www.breamoor.co.uk/software/creditcard.shtml; retrieved from http://replay.waybackmachine.org/20071128064326/http://www.breamoor.co.uk/software/creditcard.shtml.*
Prasad H., TextBox Validation, Nov. 18, 2007, C# Help. Originally available from http://www.csharphelp.com/archives/archive64.html; retrieved from http://replay.waybackmachine.org/20071118151351/http://www.csharphelp.com/archives/archive64.html.*
International Business Machines Corporation, Web site substitution (Research Disclosure Database No. 421083/Journal No. 42183), May 1999, Kenneth Mason Publications Ltd.*
Mills, Chris, Differences between Opera Mini 3 and 4, Nov. 7, 2007, Dev.Opera. Retrieved from http://dev.opera.com/articles/view/differences-between-opera-mini-3-and-4/.*
No Author, The Ultimate White Pages, Feb. 6, 2003, theultimates.com. Originally available at http://www.theultimates.com/white/; retrieved from http://replay.waybackmachine.org/20030206053402/http://www.theultimates.com/white/.*

No Author, Nintendo DS Instruction Booklet, 2005, Nintendo of America Inc. Retrieved from http://www.nintendo.com/consumer/downloads/ds_english.pdf.*
No Author, Giving gamers two windows to the Web: The Opera Browser for Nintendo DS, Feb. 15, 2006, Opera Press Releases. Retrieved from http://www.opera.com/press/releases/2006/02/15/.*
No Author, OYSTR user guide, 2006, Kyocera Wireless Corp., p. 15. Retrieved from http://www.kyocera-wireless.com/oystr-phone/pdf/oystr_user_guide_english.pdf.*
IBM, A Multi-Browser Framework for Portal Solutions, Feb. 25, 2004, ip.com Prior Art Database, pp. 1-4. No. IPCOM000022113D retrieved from http://www.ip.com/pubview/IPCOM000022113D.*
Prasad H., TextBox Validation, Nov. 2007.*
Populating Form in Parent Window with Value From Popup Window, Aug. 2003, PHP Development.*
Braemoor, JavaScript Credit Card Validation Function, Nov. 2007.*
JavaScript Form Validation, Feb. 2007, www.w3schools.com.*
Wittenburg K et al: "Visual focusing and transition techniques in a treeviewer for Web information access", Visual Languages, 1997. Proceedings. 1997 IEEE Symposium on Isle of Capri, Italy Sep. 23-26, 1997, ISBN 0-8186-8144-6, pp. 20-27.
European Patent Application No. 08748301.2 Search Report mailed Dec. 30, 2010.
Anonymous: "Products—Cookie Editor" www.proxoft.com; Apr. 10, 2008, XP002567470 Retrieved from the Internet: URL:http://web.archive.org/web/20080410221756/http://www.proxoft.com/CookieEditor.asp> [retrieved on Feb. 9, 2010].
European Patent Application No. EP 09 17 8569.1 Search Report dated Mar. 3, 2010.
TextBox Validation downloaded from http://www.csharphelp.com/archives/archive64.html.
HP WebInspect Web Application Assessment Report downloaded from http://www.it.northwestern.edu/bin/docs/Sample_Web_Assessment_Report.pdf.
Anonymous: "ieview,mozdev.org" Internet Citation, [Online] XP002404341 Retrieved from the Internet: URL:http://web.archive.org/web/20050306004931/ieview.mozdev.org/> [retrieved on Oct. 23, 2006].
Geijtenbeek Van R: Re: way to re-open (while in opera) in IE?—Message-ID: <opsh91p3ne55487ualphanuta5-xp.oslo.opera.com> Internet Citation, [Online] XP002404340 Retrieved from the Internet: URL:http://groups.google.com/group/opera.general/msg/3ff9c0c5a75984b5?dmode=source&output=gplain> [retrieved on Oct. 25, 2006].
European Patent Application No. 09178568.3 European Search Report dated Mar. 18, 2010.
European Patent Application No. 10 15 8517.2 Search Report dated Jun. 28, 2010.
No Author, NoScript, Oct. 30, 2007, Inform Action Open Source Software. Retrieved from http://replay.web.archive.org/20071030202355/http://noscript.net/ and http://replay.web.archive.org/20071027064514/http://noscript.net/faq.
No Author, Nokia Announces the Nokia WAP Browser, Jun. 30, 1999. Retrieved from http://www.wapforum.org/new/Nokia6_30_99.htm.
Microsoft Corporation, Microsoft Computer Dictionary, 2002, Microsoft Corporation, 5th Edition, p. 230.
Vander Veer, Emily; JavaScript for Dummies; 2005; Wiley Publishing Inc.; Fourth Edition; pp. 168-180.
A.S. Tanenbaum, "Computer Networks, 4th Edition", Pearson Education, Prentice Hall, US, XP002487114, 2003.
Berners-Lee MIT/W3C D Connolly T, "Hypertext Markup Language—2.0; rfc 1866.txt" IETF Standard, Internet Engineering Task Force, IETF, CH, XP015007650 ISSN: 0000-0003, Nov. 1, 1995 (Jan. 11, 1995).

* cited by examiner

SYSTEM, DEVICE AND METHOD FOR PROVIDING INTERACTIVE CONTENT ON AN COMPUTING DEVICE

FIELD

The present specification relates generally to communication technologies and more particularly to a system, device and method for providing interactive content on a computing device.

BACKGROUND

Web forms use a plurality of form elements, such as text, password, options and check inputs, to gather input and transmit the data. Different validation models are used for hypertext markup language (HTML) specifications. Web sites may use a combination of client-side Javascript™ and server-side validation processes to verify input. Client-side validations can be performed via Javascript™. Server-side validations involve submitting the form prior to providing the feedback, thereby creating loops of communication between the client and the server. Native HTML form elements also do not distinguish between alpha, numeric, special characters, so the user will decide on correct input type in conjunction of messages from Javascripts.

BRIEF DESCRIPTION OF THE DRAWINGS

FIG. 10 shows a flow-chart depicting a method for receiving and validating input on a form generated using a secondary web-browser application, or the like.

DETAILED DESCRIPTION OF THE EMBODIMENTS

Figure 1:
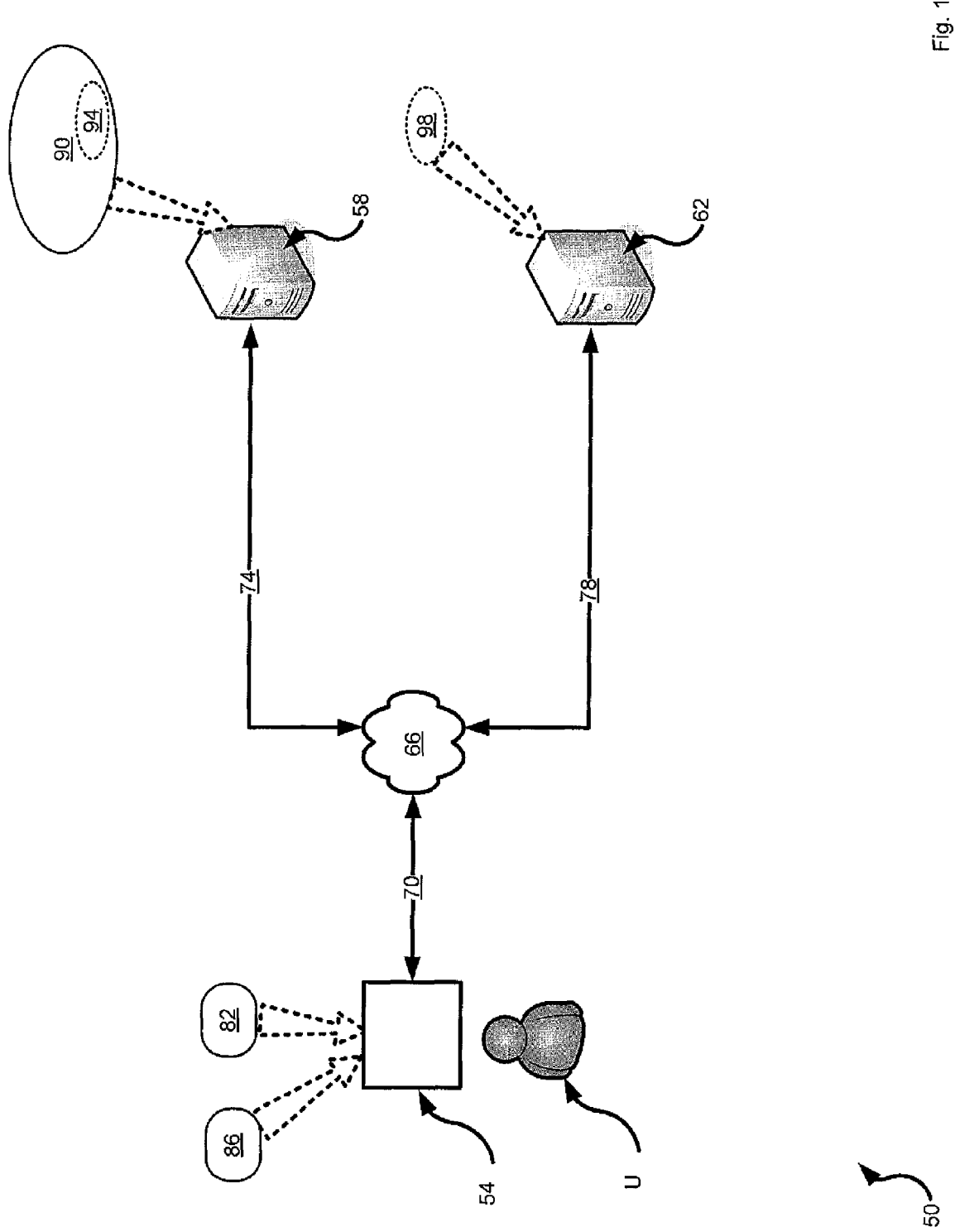
FIG. 1 is schematic representation of a system for providing interactive content on a computing device.

An aspect of the specification provides a method of providing interactive content on a computing device comprising receiving, at the computing device, a web-page from a server; the web-page including a fillable form; generating the web-page on a display of the computing device using a primary web browser application executing on a processor of the computing device; receiving, at the computing device, a schema associated with the fillable form; generating a mirrored fillable form on the display using the schema using a secondary web browser application executing on the processor; receiving input respective to in the mirrored fillable form via an input device of the computing device; populating the fillable form on the primary fillable form web browser application using the input received via the secondary web browser application; submitting sending the fillable form of the primary web browser application from the primary web-browser application as populated with the input from the computing device to the server.

The schema may be received from a schema server separate from the server.

The schema may be received from the server.

The method may further comprise confirming sufficient input has been received to complete the form prior to performing the sending.

The method may further comprise validating the input prior to performing the sending. The validating may comprise a predefined number sequence according to a particular credit card type. The input device may be a multifunction keyboard and the method may further comprise automatically setting the multifunction keyboard to accept predefined input type corresponding to expected input.

Another aspect of the specification provides a computing device configured to provide interactive content comprising; an interface configured to receive a web-page from a server via a network; the web-page including a fillable form; a processor connected to the interface and configured to execute a primary web browser application; a display connected to the processor; the processor configured to control the display via the primary web browser application so as to generate the web-page on the display; the interface further configured receive a schema associated with the fillable form; the processor further configured to execute a secondary web browser application; the processor configured to generate a mirrored fillable form on the display using the schema via the secondary web browser application; an input device connected to the processor configured to receive input respective to the mirrored fillable form, the processor further configured to populate the fillable form the primary web browser application using the input received via the secondary web browser application; the processor further configured to control the interface so as to send the fillable form of the primary web browser application as populated with the input from the computing device to the server.

The schema may be received from a schema server separate from the server.

The schema may be received from the server.

The processor may be further configured to confirm sufficient input has been received to complete the form.

The processor may be further configured to validate the input. The validating may comprise a predefined number sequence according to a particular credit card type. The input device may be a multifunction keyboard and wherein the processor is configured to automatically set the multifunction keyboard to accept predefined input type corresponding to expected input.

Another aspect of the specification provides a computer product configured to store a plurality of programming instructions for controlling a computing device and implementing method of providing interactive content on a computing device comprising: receiving, at the computing device, a web-page from a server; the web-page including a fillable form; generating the web-page on a display of the computing device using a primary web browser application executing on a processor of the computing device; receiving, at the computing device, a schema associated with the tillable form; generating a mirrored fillable form on the display using the schema using a secondary web browser application executing on the processor; receiving input respective to the mirrored fillable form via an input device of the computing device;

populating the fillable form on the primary web browser application using the input received via the secondary web browser application; sending the fillable form of the primary web browser application as populated with the input from the computing device to the server.

Another aspect of the specification provides a system configured to provide interactive content comprising: at least one server configured to host a web page having a fillable form and a schema associated with the fillable form; a computing device comprising: an interface configured to receive the web page from the server via a network; the web-page including a fillable form; a processor connected to the interface and configured to execute a primary web browser application; a display connected to the processor; the processor configured to control the display via the primary web browser application so as to generate the web-page on the display; the interface further configured receive the schema; the processor further configured to execute a secondary web browser application; the processor configured to generate a mirrored fillable form on the display using the schema via the secondary web browser application; an input device connected to the processor configured to receive input respective to the mirrored fillable form; the processor further configured to populate the fillable form on the primary web browser application using the input received via the secondary web browser application; the processor further configured to control the interface so as to send the fillable form of the primary web browser application as populated with the input from the computing device to the server.

The at least one server may comprise a web server.

The at least one server may comprise a web server for hosting the web page and a schema server for hosting the schema.

Another aspect of the specification provides a schema server comprising a processor; storage connected to the processor configured to maintain a schema respective to a primary fillable form on a web-page; the web-page configured to cooperate with a primary web browser application to generate the web-page with the primary fillable form; an interface controllable by the processor and connectable to a computing device via a network; the processor configured to respond to a request from the computing device to send the schema to the computing device via the network; the schema configured to cooperate with a secondary web browser application on the computing device such that the computing device is configured to generate a secondary fillable form using the schema via the secondary web browser application in place of the primary fillable form.

Referring to FIG. 1, a system for providing interactive content on a computing device is indicated generally at 50. In a present embodiment system 50 comprises a first computing device in the form of a client machine 54 and a second computing device in the form of a web server 58, and a third computing device in the form of a schema server 62. A network 66 interconnects each of the foregoing components. A first link 70 interconnects client machine 54 and network 66. A second link 74 interconnects server 58 and network 66. A third link interconnects server 62 and network 66.

Figure 2:
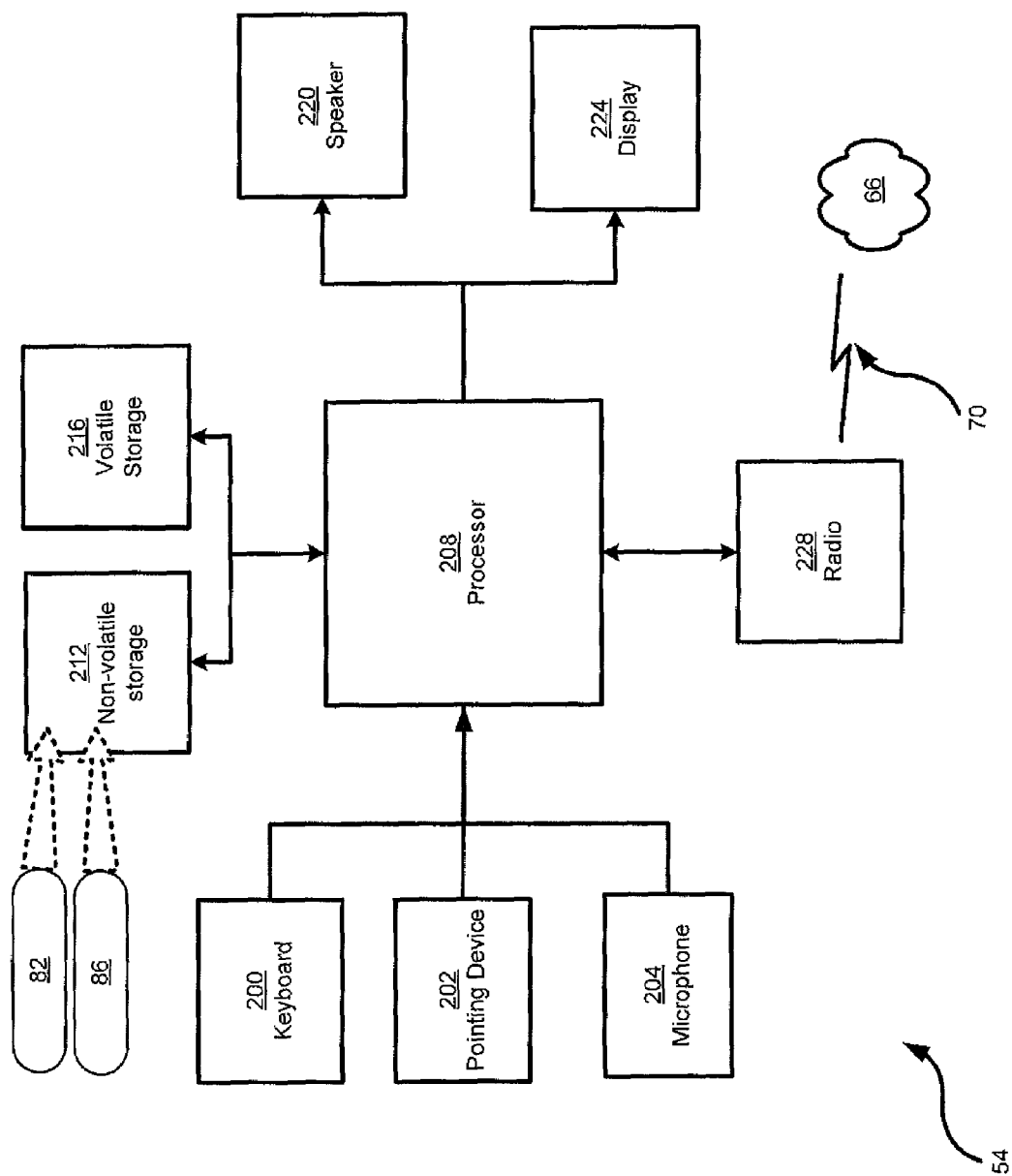
FIG. 2 is a schematic representation of the client machine computing device in FIG. 1.

Referring briefly to FIG. 2, a schematic block diagram shows client machine 54 in greater detail. It should be emphasized that the structure in FIG. 2 is purely exemplary, and contemplates a device that may be used for both wireless voice (e.g. telephony) and wireless data (e.g. email, web browsing, text) communications. Client machine includes a plurality of input devices which in a present embodiment includes a keyboard 200, a pointing device 202 (e.g. a trackwheel, a trackball, or a touch screen) and a microphone 204. Other input devices, such as a camera may be provided. Input from keyboard 200 and microphone 204 is received at a processor 208, which in turn communicates with a non-volatile storage unit 212 (e.g. read only memory ("ROM"), Erasable Electronic Programmable Read Only Memory ("EEPROM"), Flash Memory) and a volatile storage unit 216 (e.g. random access memory ("RAM")).

Programming instructions that implement the functional teachings of client machine 54 as described herein are typically maintained, persistently, in non-volatile storage unit 212 and used by processor 208 which makes appropriate utilization of volatile storage 216 during the execution of such programming instructions. Of particular note is that non-volatile storage unit 212 persistently maintains a primary web browser application 82 and a secondary web browser application 86, each of which can be executed on processor 208 making use of nonvolatile storage 216 as appropriate. Various other applications (not shown) are maintained in non-volatile storage unit 212 according to the desired configuration and functioning of client machine 54.

Primary web browser application 82 is configured to provide basic web browser functionality on client-machine 54. Primary web browser application 82 can be referred to as a mini-browser, in the sense that it is provided on client machine 54 which has a form factor that is "miniaturized", at least in relation to the form factor of a desk top computer. As will be explained further below, primary web browser application 82 is configured to re-render web-pages on the relatively small display of client machine 54, and during such re-rendering attempt to render those pages in a format that conveys data, as much as possible, substantially in the same manner as if those web-pages had been rendered on a full browser such as Internet Explorer® (from Microsoft Corporation, One Microsoft Way, Redmond, Wash.) or Firefox® (from Mozilla Foundation, 1981 Landings Drive, Building K, Mountain View, Calif. 94043-0801, USA.) on a traditional desktop or laptop computer. Primary web browser application 82 thus provides basic HTML and other web-browsing capability, such as Java script, although subject to features provided in secondary web browser application 86. Indeed, secondary web browser application 86 is configured to relieve primary web browser application 82 of certain scripting functions and the like, as will be discussed in greater detail below. In general, client machine 54 is configured to interact with content available over network 66, including web content on web server 58 via primary web browser application 82 and secondary web browser application 86.

Returning again to FIG. 1, web server 58 is configured to host a web-page 90 that includes, in a present embodiment, programming instructions representing fillable forms 94. Web-page 90 and fillable forms 94 configured to be accessible from a traditional desktop browser, such as Internet Explorer®, or Firefox®. As will be explained in greater detail below, primary web browser application 82 is configured to access web-page 90 and to provide interaction with fillable forms 94 via secondary web browser application 86. Schema server 62 is configured to maintain a web-form schema 98 which can be used by secondary web browser application 86 to manage fillable forms 94. Schema 98 maintains a mirror of fillable form 98 that can be used by secondary web browser application 86, as will be discussed further below.

Web server 58 and schema server 62 (which can, if desired, be implemented on a single server) can be based on any well-known server environment including a module that houses one or more central processing units, volatile memory (e.g. random access memory), persistent memory (e.g. hard disk devices) and network interfaces to allow servers 58 and 62 to communicate over network 66. For example, server 58 or server 62 or both can be a Sun Fire™ V480 running a UNIX operating system, from Sun Microsystems, Inc. of Palo Alto Calif., and having four central processing units each operating at about nine-hundred megahertz and having about sixteen gigabytes of random access memory. However, it is to be emphasized that this particular server is merely exemplary, and a vast array of other types of computing environments for servers 58 and 62 are contemplated.

It should now be understood that the nature of network 66 and the links 70, 74 and 78 associated therewith is not particularly limited and are, in general, based on any combination of architectures that will support interactions between client machine 54 and servers 58 and 62. In a present embodiment network 66 itself includes the Internet as well as appropriate gateways and backhauls to links 70, 74 and 78. Accordingly, the links 70, 74 and 78 between network 66 and the interconnected components are complementary to functional requirements of those components.

More specifically, link 70 between client machine 54 and network 66 can be based in a present embodiment on core mobile network infrastructure (e.g. Global System for Mobile communications ("GSM"); Code Division Multiple Access ("CDMA"); CDMA 2000; 3G) or on wireless local area network ("WLAN") infrastructures such as the Institute for Electrical and Electronic Engineers ("IEEE") 802.11 Standard (and its variants) or Bluetooth® or the like or hybrids thereof. Note that in an exemplary variation of system 50 it is contemplated that client machine 54 could be based on other types of client machines whereby link 70 is a wired connection.

Link 74 can be based on a T1, T3, O3 or any other suitable wired or wireless connection between server 58 and network 66. Link 78 which can be based on a T1, T3, O3 or any other suitable wired or wireless connection between server 62 and network 66.

Figure 3:
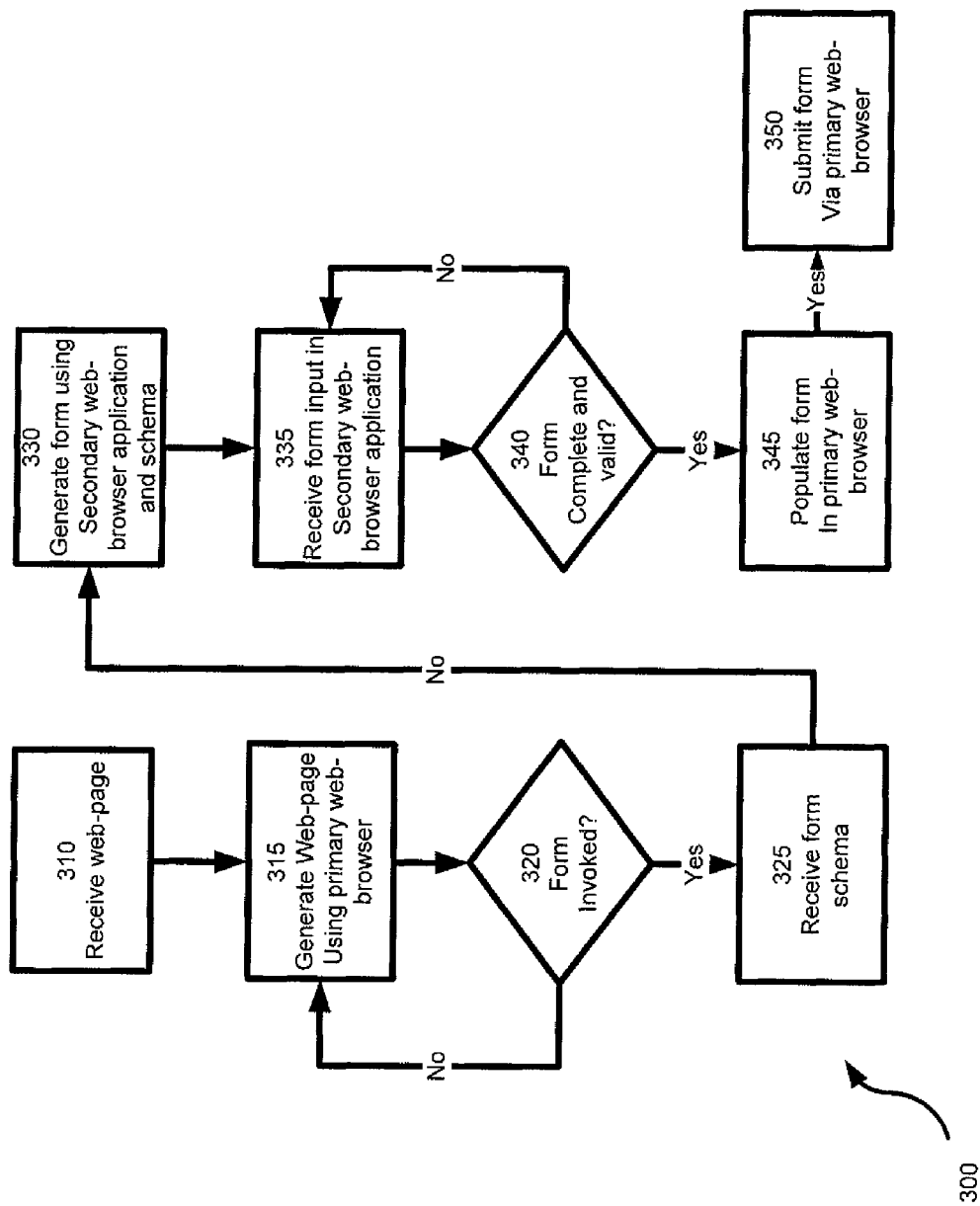
FIG. 3 shows a flow-chart depicting a method of providing interactive content.

Referring now to FIG. 3, a method for providing interactive content on a computing device is provided in the form of a flow-chart indicated generally at 300. Method 300 will be explained in conjunction with its exemplary performance on system 50, but it should be understood that system 50 and method 300 can both be varied within the scope of the present teachings. For example, the method 300 need not performed in the exact sequence as presented in FIG. 3.

Figure 4:
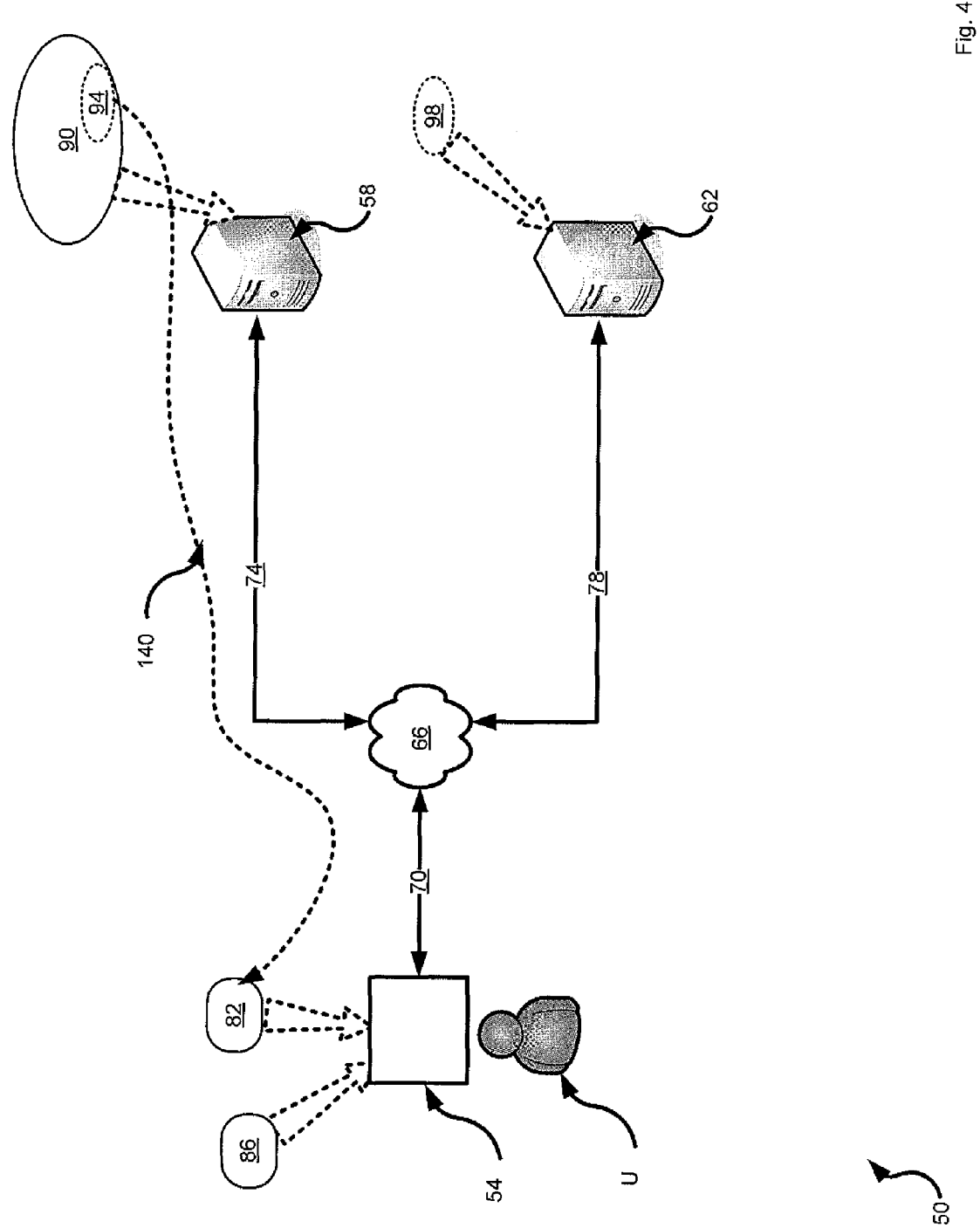
FIG. 4 shows exemplary performance of block 310 on the system of FIG. 1.

Block 310 comprises receiving a web-page. In system 50, block 310 is performed by client machine 54, which accesses web-page 90 via network 66 in the usual manner. In a present embodiment, primary web browser application 82 retrieves web-page 90 via network 66 from server 58 in the usual manner. Block 310 is represented in FIG. 4 as web-page 90 is shown as downloaded to client machine 54 using primary web browser application 82. Note that fillable form 94 is also retrieved as part of this process.

Figure 5:
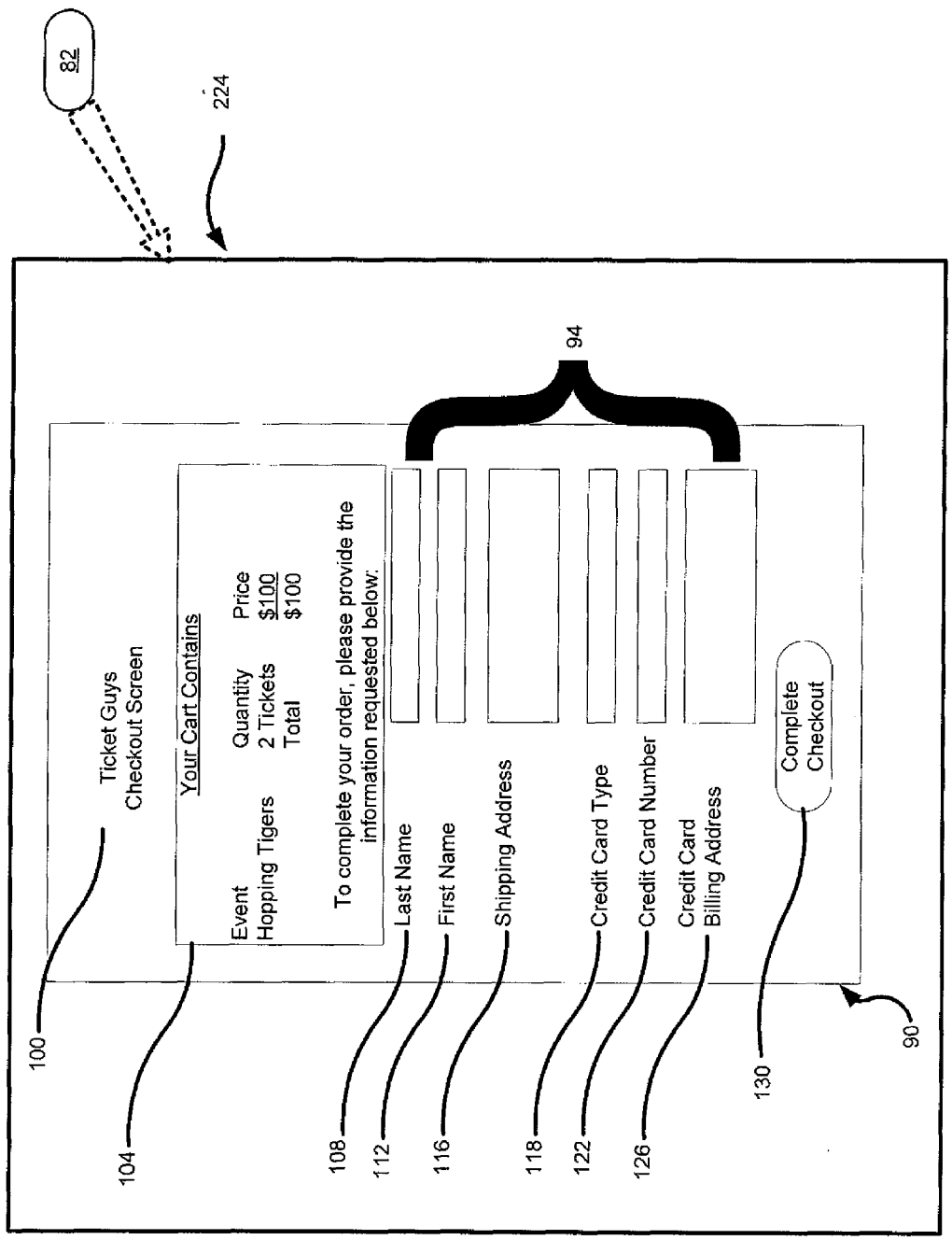
FIG. 5 shows an example of a web-page as generated by a primary web browser application using the method of FIG. 3.

Block 315 comprises generating a web-page using a primary web browser application. Primary web browser application 82 thus generates web-page 90, including fillable form 94, on display 224. FIG. 5 shows a simplified example of web-page 90 generated on display 224, in the form of a check-out screen 100 for an on-line ticket purchase from a fictitious web-site known as "Ticket Guys". It is to be reemphasized that FIG. 5 is exemplary, and simplified for the purpose of ease of explanation. Check-out screen 100 includes a completed "cart" that shows a tentative purchase of two tickets for an event titled "Hopping Tigers" and a sale of two tickets. Check out screen 100 also includes fillable form 94, which itself includes a last name field 108, a first name field 112, a shipping address field 116 (which itself can comprise of a plurality of separate fields, such as street address, city, state, country, zip code), a credit card type field 118, a credit card number field 122, and a credit card billing address field 126. Check-out screen 100 also includes a "complete checkout" button 130, which when selected submits completed fillable form 94 back to server 58.

In a present embodiment, web-page 90 is generated in substantially the same form as it would be generated on a regular desktop browser, except that web-page 90 itself is reduced in size. Client machine 54 and web browser application 82 are configured to receive selections of various portions of display 224, and if such selections are activated, then to "zoom in" on such selected portions on display 224 and cropping the non-selected portions of web-page 90. Such functionality for web browser application 82 is currently found in the web browser currently implemented in the BlackBerry Bold™ client machine from Research In Motion™ Limited, though to be clear this is a non-limiting example, and this functionality is not required.

Returning again to FIG. 3, block 320 comprises a determination as to whether or not the form on the page from block 310 has been invoked. If "no", then method 300 returns to block 315. Note that at block 315 all other operations associated with web browser application 82 are available, including closing the web-page and thereby terminating method 300 altogether.

On a "yes" determination at block 320, block 325 is invoked. A "yes" determination can be made at block 320 in various ways. For example, a cursor could be placed on or over any one of the fields in fillable form 94 using pointing device 202. Web browser application 82 can be configured so that mere placement of the cursor in such vicinity causes a "yes" determination at block 320. Other ways to cause a "yes" determination include a cursor placement followed by a definitive input such as depression of a button on keyboard 200, or some other "click" or select function associated with pointing device 202.

Block 325 comprises receiving form schema. Block 325 (which may be performed earlier in method 300) is performed by client machine 54 which accesses schema server 62 and downloads schema 98 from server 62.

Figure 6:
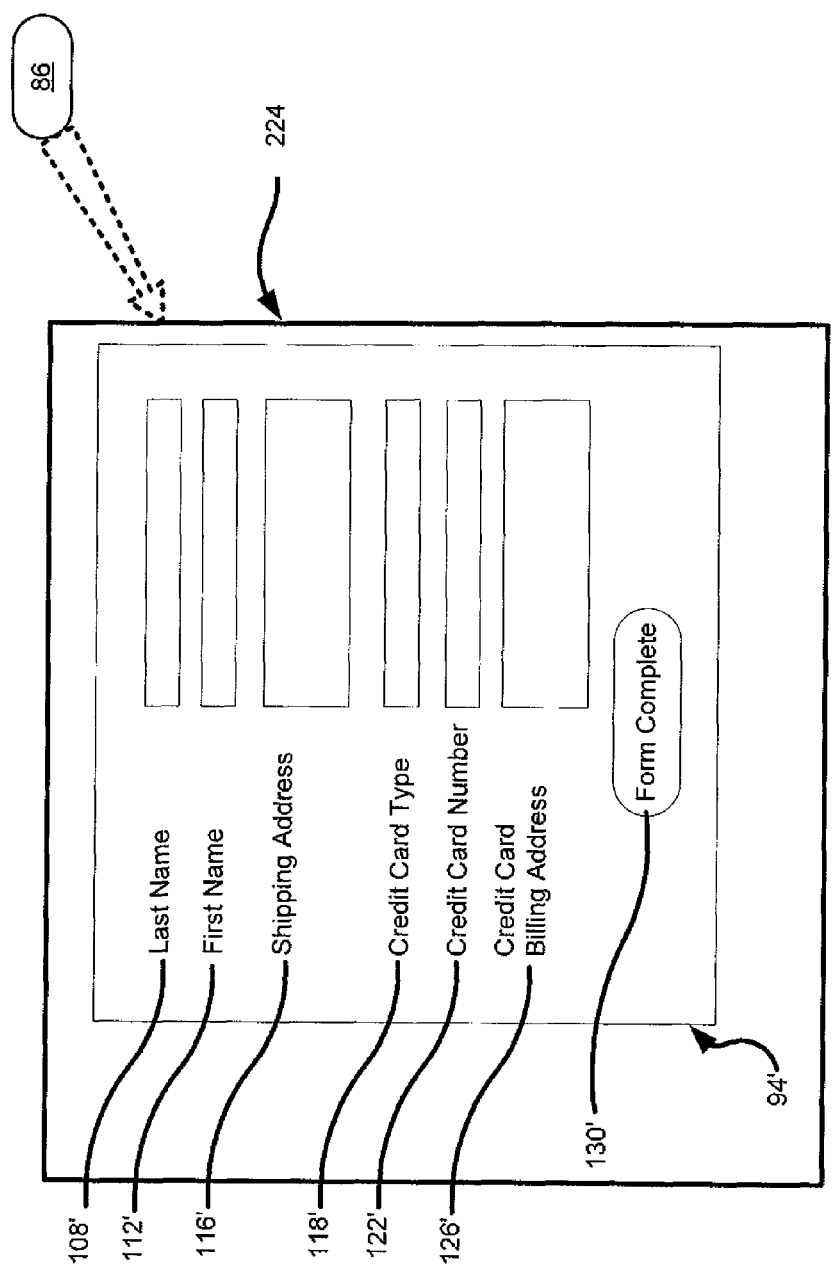
FIG. 6 shows an example of a fillable form from the web-page of FIG. 5 as generated by a secondary web browser application using the method of FIG. 3.

Block 330 comprises generating the form. In the present embodiment the form is generated using the secondary web browser application and the schema. Secondary web browser application 86 is configured to generate a mirrored, but graphically simplified version of fillable form 94. The graphical simplification can be effected by using text and blank-space, but no graphics, and which can be scrollable across different screens in display 224 (not shown). No Java™ or other web-based scripts associated with web-page 90 would be executed as part of performance of block 330 and indeed block 330 would be effected in lieu of any such scripts that would normally be associated with web-page 90 or fillable form 94. Performance of block 330 is represented in FIG. 6 which shows a mirrored version of fillable form 94, identified in FIG. 6 as mirrored fillable form 94' and which also includes fields 108', 112', 116', 118', 122', 126'.

Figure 7:
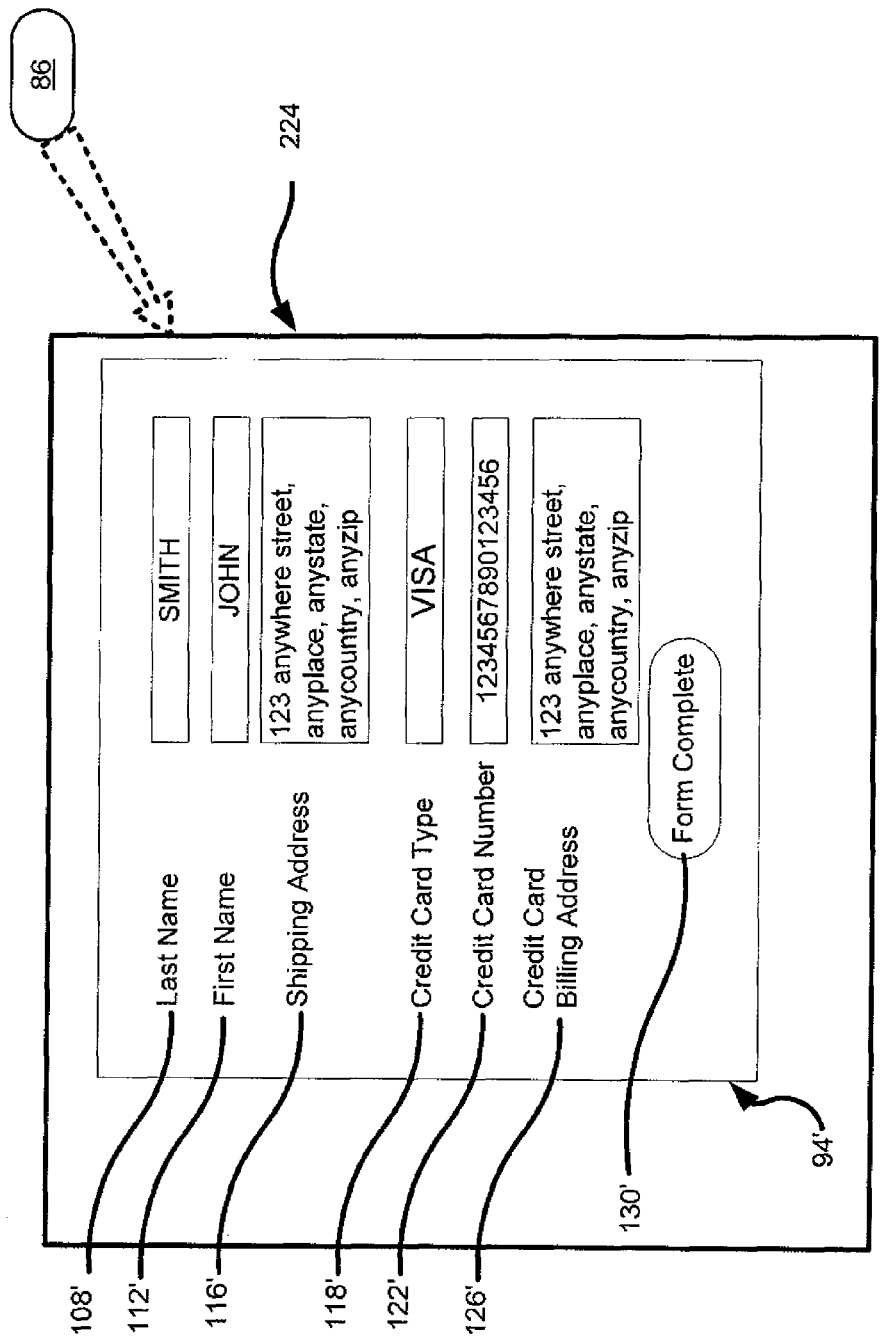
FIG. 7 shows an exemplary completed version of the form of FIG. 6.

Block 335 comprises receiving input in the mirrored fillable form 94', and block 340 comprises determining if form 94' has been validly completed. Block 335 and block 340 can include validations for expected inputs in each field. For example, schema 98 can provide instructions to secondary web browser application 86 so that credit card number field 122' will only accept a certain number sequence that corresponds with a credit card type in credit card type field 118'. Similarly, schema 98 can provide instructions to secondary web browser application 86 such that multi-functions on keyboard 200 are automatically set to a particular type of expected input. For example, if keyboard 200 includes multi-function keys that represent both letters and numbers, then when credit card number field 122' is being completed, processor 208 can be configured to interpret input from multi-function keys on keyboard 200 as numbers, rather than letters or punctuation, thereby obviating the need for manually setting the input type to numbers. Likewise, when last name field 108' and first name field 112' are being completed, processor 208 can be configured to interpret input from multi-function keys on keyboard 200 as only letters. A more detailed example of implementation of block 335 is provided below. A completed exemplary representation of form 94' is shown in FIG. 7.

A "yes" determination is made at block 340 when form 94' is validly completed and the form complete selector 130' has been activated. (A "cancel" selector can of course also be provided, but for simplicity this is not shown in the example).

Figure 8:
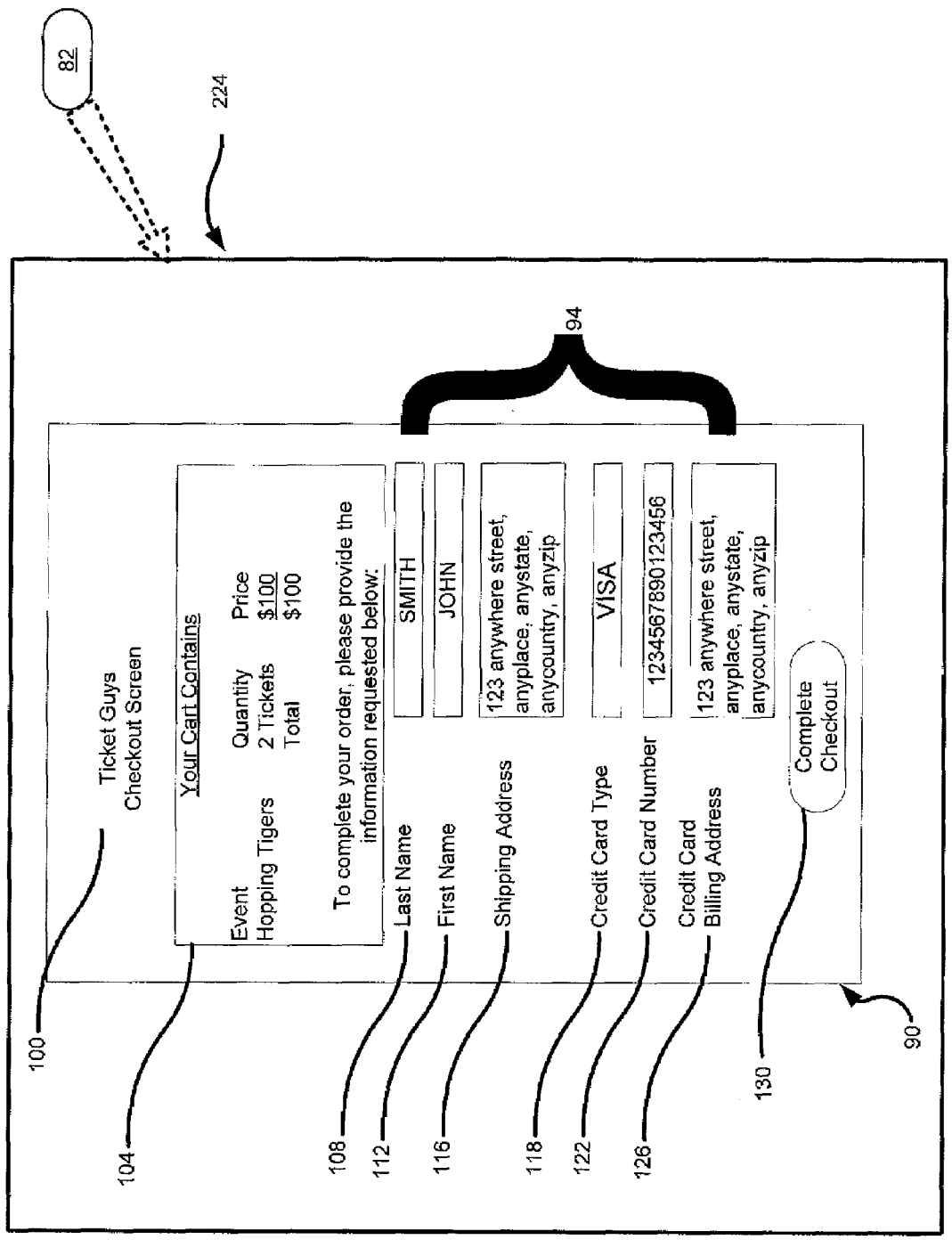
FIG. 8 shows an exemplary completed version of the form of FIG. 5 using the completed form from FIG. 7.

Block 345 comprises populating the form in the primary web browser application 82. In the present example, the contents from form 94' as received at block 335 are automatically placed into form 94 as generated at block 315. FIG. 8 shows exemplary performance of block 345, as the contents from form 94' in FIG. 7 are automatically placed into form 94 on web-page 90.

At this point, selection of "complete checkout" button 130 invokes block 350 at which point form 94 is submitted to server 58 via the primary web browser, using the contents of form 94 as populated at block 345. In this manner, server 58 receives a response from client machine 54 that is in substantially the same form as would be received from traditional desktop web browser. At the same time, using method 300, the processing limitations of device 54 are addressed by reducing the amount of complex Java™ script associated with form 94 that needed to be executed. Likewise, data entry via the awkward a miniaturized version of navigation form 94 on primary web browser application 82 is obviated by use of form 94' on secondary web browser application 86. Additionally, errors on form 94 are reduced through validation and enforcement of automated selection of modes for multi-keys by secondary web browser application 86 via form 94'.

Figure 9:
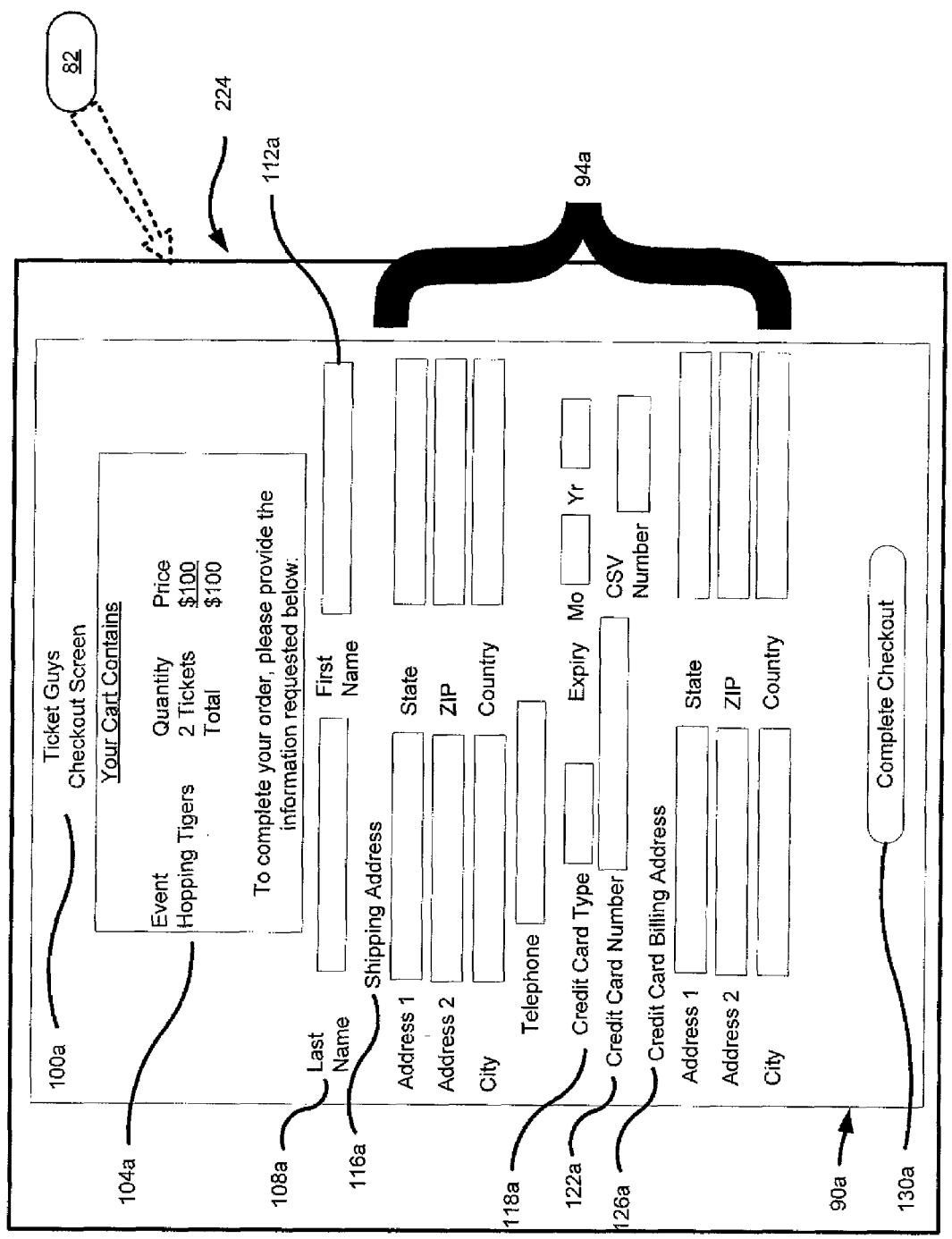
FIG. 9 shows a further example of a fillable form as a variation on the fillable form the web-page of FIG. 5.

Those skilled in the art are to understand that subsets, combinations and variations of the foregoing are contemplated. For example, FIG. 9 shows a more complex example of an exemplary of web-page 90a generated on display 224, in the form of a check-out screen 100a for the above-mentioned on-line ticket purchase from a fictitious web-site known as "Ticket Guys". Web-page 90a includes many of the same elements as web-page 90, and therefore like elements in web-page 90a bear like references, except followed by the suffix "a". Web-page 90a thus includes form 94a, except that form 94a has several additional fields. For example, shipping address 116a of form 94a includes several sub-fields, including Address 1, Address 2, City, State, ZIP, Country. A Telephone number field is also provided in form 94a. Furthermore, form 94a also includes a credit card Expiry fields, with a separate sub-field for Month ("Mo") and a separate sub-field for Year ("Yr"). Furthermore, form 94a also includes a credit card CSV Number field, which is associated with a three or four digit verification number commonly found on the reverse side of credit cards. Furthermore, credit card billing address 126a of form 94a includes several sub-fields, including Address 1, Address 2, City, State, ZIP, Country. It is to be understood that the foregoing is a non-limiting and that certain fields in form 94a may be omitted, or alternative fields provided, or additional fields provided in form 94a. Method 300 as described above can be invoked in order to generate a secondary form at block 330 corresponding to form 94a, (or a sequence of secondary forms can be generated, if screen size is too limited), such that blocks 330-340 are used to receive data for form 94a, and so that such data can ultimately be used to populate form 94a at block 345.

Figure 10:
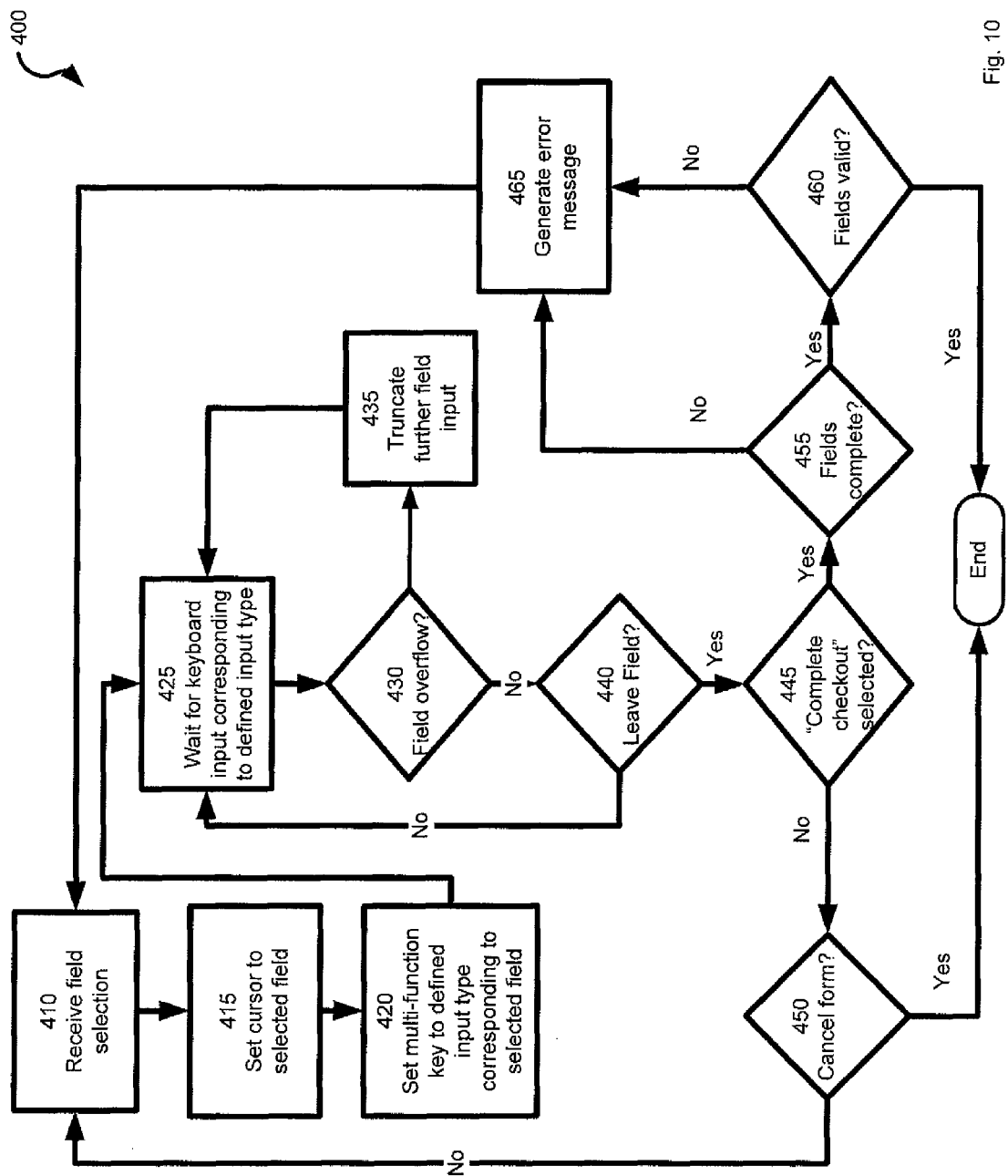

It is also to be understood that blocks 335 through 340 can be implemented in a variety of ways. Referring now to FIG. 10, a method for receiving and validating input on a form generated using a secondary web-browser application, or the like, is provided in the form of a flow-chart indicated generally at 400. Method 400 thus represents one possible way of implementing blocks 335 through 340, once a secondary form has been generated at block 330. Method 400 can thus be used on form 94', or on a form generated based on form 94a. Method 400 will now be explained, however, with reference to form 94'.

At block 410, a field selection is received. For example, while form 94' is generated on display 224 as shown in FIG. 6, pointing device 202 can be used to manipulate a screen-pointer or the like to a location corresponding to any one of the fields on form 94'. Further input, such as a "click" action, can be used to positively select the field at the selected location. At block 415, the cursor is set to the selected field, indicating that input for that field is now expected.

At block 420, multifunction keys on the keyboard are set to a predefined input type that corresponds to the field selected at block 415. More specifically, processor 208 is configured to accept input from any multi-function keys on keyboard 200 according to a setting that corresponds to an expected type of input for the selected field. For example, assume that keys labeled "1", "2", "3", "4", "5", "6", "7", "8", "0", on keyboard 200 are multi-function keys that can be used to receive numeric input, but are also respectively labeled "A", "B", "C", "D", "E", "F", "G", "H", "I", "J" such that the same keys can be used to receive alphabetic inputs corresponding to those ten letters. Assume also that keyboard 200 includes a selector key, such as a "shift" or "control" or "alt" key that can be used to indicate whether numeric input or alphabetic input is selected for those multi-function keys. Thus, at block 420, assume that field 108' has been selected at block 415, then at block 420, processor 208 is configured such that input from the above-mentioned multifunction keys is interpreted as alphabetic. By the same token, however, if credit card number field 122' was selected at block 415, then at block 420, processor 208 is configured such that input from the above-mentioned multi-function keys is interpreted as numeric. Where the field selected at block 415 can be either alphabetic or numeric, then processor 208 is configured to accept either alphabetic or numeric input.

Block 425 comprises waiting for input that corresponds to the input type defined at block 420. Thus, at block 425, processor 208 is configured to accept input from keyboard 200 according to the setting from block 420. At block 430, a determination is made as to whether there has been an overflow in the selected field. The specific determination at block 430 is rule based according to the field selected at block 415. For example, if credit card number field 122' was selected at block 415, and the corresponding credit card type was a VISA card in field 118', then processor 208 can be configured such that a field overflow would be deemed to occur when more than sixteen digits was entered into field 122', leading to a 'yes' determination at block 430. At block 435, further input is truncated or refused, and method 400 cycles back to block 425.

If a "no" determination is mad at block 440, then a determination is made at block 440 is the field has been exited. A "no" determination at block 440 results in method 400 cycling back to block 425. A "yes" determination at block 440 results in method 400 advancing to block 445. A yes determination can be made at block 440 when any input is received from keyboard 200 or pointing device 202 indicating that further input into the field selected at block 415 has been terminated.

Block 445 comprises determining if the "checkout complete" button (e.g. button 130') as been selected. If "no", then at block 450 a determination is made if input has been received indicating that completion of the form is being cancelled. Such an indication can be based on input from keyboard 200 or pointing device 202 representing such cancellation—e.g. a selection of a "cancel" button generated on display 224 (not shown). A "yes" determination at block 450 ends method 400. A "no" determination at block 450 results in method 400 cycling back to block 410.

A "yes" determination at block 445 results in method 400 advancing to block 455. At block 455, a determination is made if all fields on form 94' are completed. If no, then method 400 moves to block 460 and an error message is indicated at block 460 indicating that the fields are not all complete, at which point method 400 then cycles back to block 410. The error message at block 465 can specifically indicate which fields are in form 94' are not complete. Also, during a cycle from block 465 to block 410, any field that is not complete can be automatically be deemed to be selected at block 410.

If a yes determination is made at block 455, then at block 460 a determination is made if the contents of the fields of form 94' as completed are valid. For example, a field can be invalid if credit card number does not match an expected range of credit card numbers that correspond to the selected credit card type. More complex validation checks can be made if a more complex form is generated at block 330, such as a form based on form 94a. For example, if the month is the credit card expiry field is a number greater than twelve or less than zero, then the validation at block 460 can fail resulting in a no determination. If at block 460 the fields are not validated then at block 465 an error message is generated so indicating, and method 400 cycles back to block 410.

It should also now be understood that variations of method 400 are contemplated. For example, validations from block 460 can also be performed as part of block 430 while a particular field is being populated, thereby obviating block 460, or supplementing block 460.

In general it should be understood that methods 300 and 400 comprise, in part, configuring processor 208 according to certain rules for expected input.

It should now also be understood that methods 300 and 400 are performed by client machine 54, thereby obviating the need for validation by server 58, and thereby reducing bandwidth consumption over link 70 and link 74. Furthermore, consumption of computing resources of client machine 54 can be reduced using methods 300 or 400 or both, as processor 208 need not communicate with server 58 via link 70 and link 74 in order to participate in such validations. Likewise, consumption of battery resources in client machine 54 can be reduced by reduction of utilization of radio 228 and processor 208.

The claims attached hereto define the scope of the monopoly sought.

The invention claimed is:

1. A computing device configured to provide interactive content comprising:
an interface configured to receive a web-page from a server via a network; said web-page including a fillable form;
a processor connected to said interface and configured to execute a primary web browser application;
a display connected to said processor; said processor configured to control said display via said primary web browser application so as to generate said web-page with said fillable form on said display;
said interface further configured to receive a schema associated with said fillable form;
said processor further configured to execute a secondary web browser application; said processor configured, in response to a determination that said fillable form has been invoked in said primary web browser application, to automatically generate a mirrored fillable form on said display using said schema via said secondary web browser application;
an input device connected to said processor configured to receive input respective to said mirrored fillable form;
said processor further configured to populate said fillable form on said primary web browser application using said input received via said secondary web browser application; and
said processor further configured to control said interface so as to send said fillable form of said primary web browser application as populated with said input from said computing device to said server.

2. The computer device of claim 1 wherein said schema is received from a schema server separate from said server.

3. The computing device of claim 1 wherein said schema is received from said server.

4. The computing device of claim 1 wherein said processor is further configured to confirm sufficient input has been received to complete said mirrored fillable form.

5. The computing device of claim 1 wherein said processor is further configured to validate said input.

6. The computing device of claim 5 wherein said processor is configured to validate said input according to an expected predefined number sequence associated with a particular credit card type.

7. The computing device of claim 1 wherein said input device comprises a multifunction keyboard and wherein said processor is further configured to automatically set said multifunction keyboard to accept predefined input type according to a rule for expected input.

8. The computing device of claim 1 wherein said computing device comprises a wireless portable computing device.

9. A method of providing interactive content on a computing device, the method comprising:
receiving, at said computing device, a web-page from a server; said web-page including a fillable form;
generating said web-page with said fillable form on a display of said computing device using a primary web browser application executing on a processor of said computing device;
receiving, at said computing device, a schema associated with said fillable form;
determining that said fillable form has been invoked in said primary web browser application, and in response automatically generating a mirrored fillable form on said display using said schema using a secondary web browser application executing on said processor;
receiving input respective to said mirrored fillable form via an input device of said computing device;
populating said fillable form on said primary web browser application using said input received via said secondary web browser application;

sending said fillable form of said primary web browser application as populated with said input from said computing device to said server.

10. The method of claim 9 wherein said schema is received from a schema server separate from said server.

11. The method of claim 9 wherein said schema is received from said server.

12. The method of claim 9 further comprising confirming sufficient input has been received to complete said mirrored fillable form prior to performing said sending.

13. The method of claim 9 further comprising validating said input prior to performing said sending.

14. The method of claim 13 wherein said validating comprises a predefined number sequence according to a particular credit card type.

15. The method of claim 9 wherein said input device comprises a multifunction keyboard and wherein said method further comprises automatically setting said multifunction keyboard to accept predefined input type according to a rule for expected input.

16. A non-transitory computer readable medium configured to store a plurality of programming instructions for controlling a computing device and implementing method of providing interactive content on a computing device comprising:

receiving, at said computing device, a web-page from a server; said web-page including a fillable form;

generating said web-page with said fillable form on a display of said computing device using a primary web browser application executing on a processor of said computing device;

receiving, at said computing device, a schema associated with said fillable form;

determining that said fillable form has been invoked in said primary web browser application, and in response automatically generating a mirrored fillable form on said display using said schema using a secondary web browser application executing on said processor;

receiving input respective to said mirrored fillable form via an input device of said computing device;

populating said fillable form on said primary web browser application using said input received via said secondary web browser application;

sending said fillable form of said primary web browser application as populated with said input from said computing device to said server.

17. A system configured to provide interactive content comprising:

at least one server configured to host a web page having a fillable form and a schema associated with said fillable form;

a computing device comprising:

an interface configured to receive said web page from said server via a network; said web-page including a fillable form;

a processor connected to said interface and configured to execute a primary web browser application;

a display connected to said processor; said processor configured to control said display via said primary web browser application so as to generate said web-page with said fillable form on said display;

said interface further configured to receive said schema;

said processor further configured to execute a secondary web browser application; said processor configured, in response to a determination that said fillable form has been invoked in said primary web browser application, to automatically generate a mirrored fillable form on said display using said schema via said secondary web browser application;

an input device connected to said processor configured to receive input respective to said mirrored fillable form;

said processor further configured to populate said fillable form on said primary web browser application using said input received via said secondary web browser application;

said processor further configured to control said interface so as to send said fillable form of said primary web browser application as populated with said input from said computing device to said server.

18. The system of claim 17 wherein said at least one server comprises a web server.

19. The system of claim 17 wherein said at least one server comprises a web server for hosting said web page and a schema server for hosting said schema.

* * * * *